Nov. 18, 1941.  A. C. COX  2,263,120
GROUND WORKING IMPLEMENT
Filed April 17, 1939   2 Sheets-Sheet 1
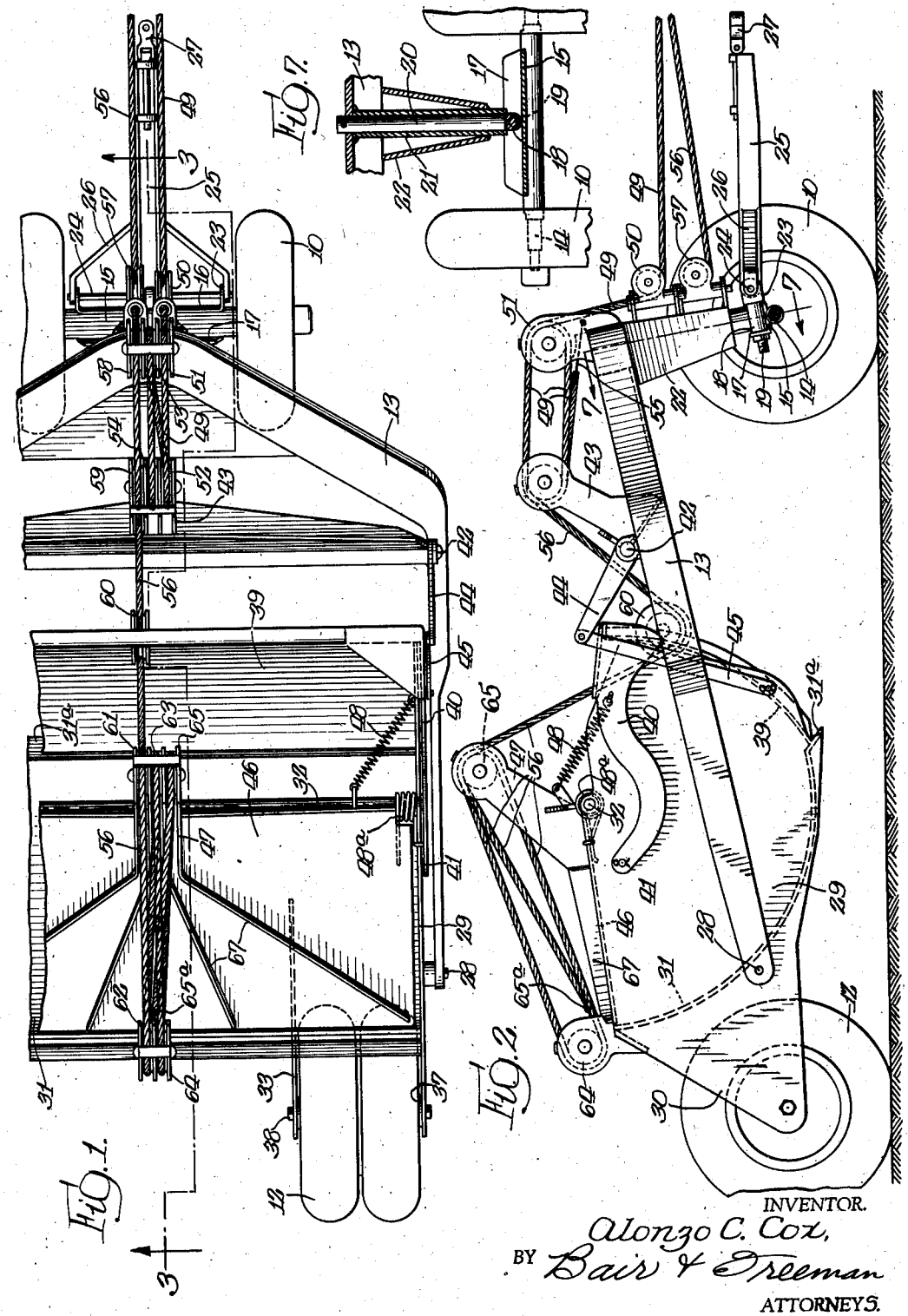
INVENTOR.
Alonzo C. Cox,
BY Bair & Freeman
ATTORNEYS.

Nov. 18, 1941.     A. C. COX     2,263,120
GROUND WORKING IMPLEMENT
Filed April 17, 1939     2 Sheets-Sheet 2
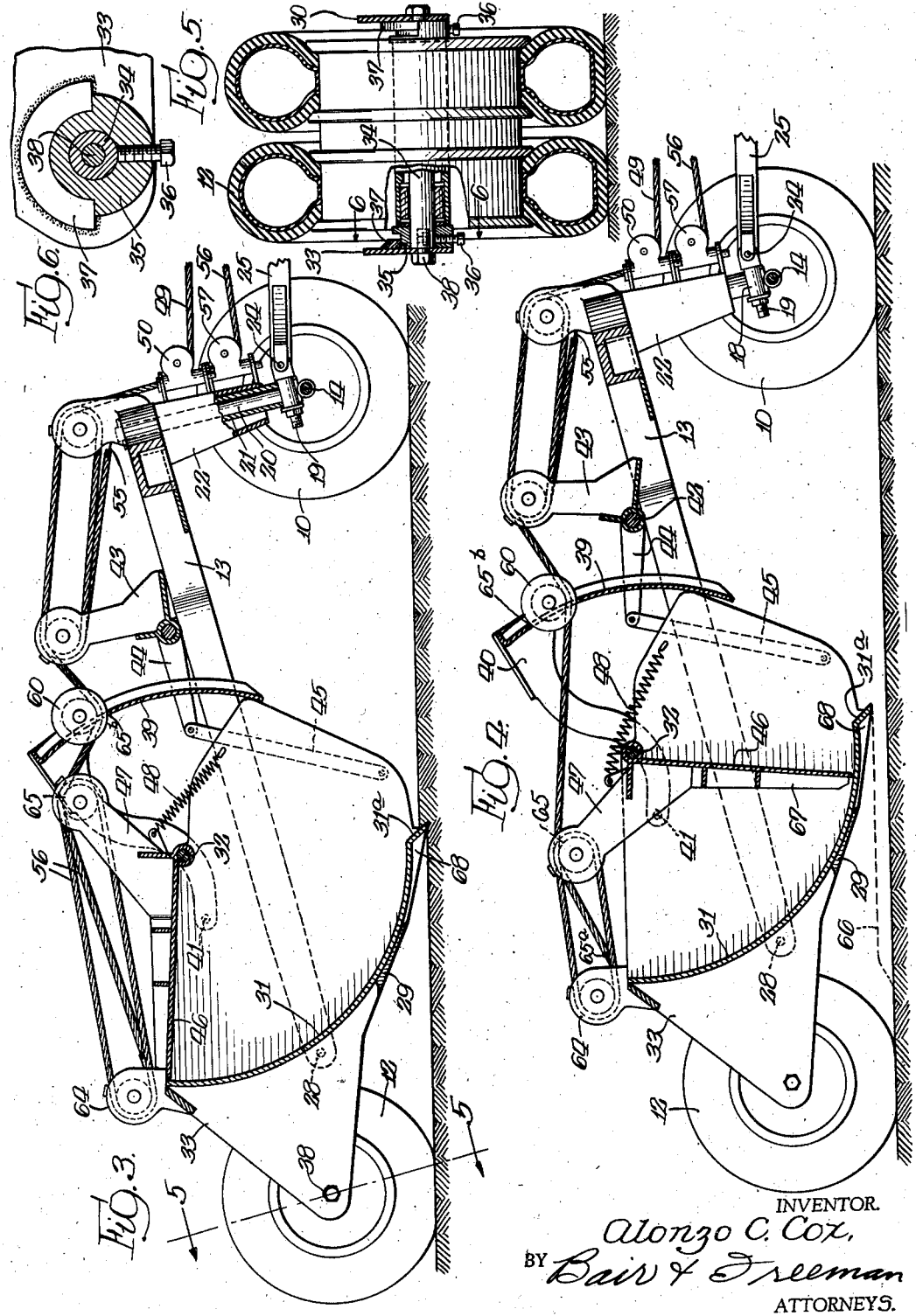
INVENTOR.
Alonzo C. Cox,
BY Bair & Freeman
ATTORNEYS.

Patented Nov. 18, 1941

2,263,120

UNITED STATES PATENT OFFICE 2,263,120

GROUND WORKING IMPLEMENT

Alonzo Chloe Cox, Cantril, Iowa

Application April 17, 1939, Serial No. 268,321

8 Claims. (Cl. 37—126)

An object of my present invention is to provide a ground working implement of durable and inexpensive construction which can be readily fabricated.

A further object is to provide a ground working implement in which a scraper bowl may be raised for carrying and spreading operations or lowered for digging operations and has associated with it an apron for the front end thereof and a push out blade adapted to push material out of the scraper bowl when desired.

Another object is to provide means consisting of a pair of cables which are so connected with the scraper bowl, the apron and the push out blade that the desired operation of these three members from the two cables may be had.

More particularly it is an object to provide one cable for raising and lowering the scraper bowl and another for controlling the apron and push out blade, the parts being so constructed and arranged as to open the apron to substantially its full open position and thereafter operate the push out blade by moving it to active position, both of these operations being performed by the second cable.

Still another object is to provide a ground working implement in which there is a novel construction of rear wheel arranged for ready removal of the wheel when it is desirable to repair the tires thereof or perform other operations on the wheels and tires.

Still a further object is to provide a front axle construction which permits ready tipping of the front wheels to pass over irregular ground without any undesired binding of the parts.

Other objects, purposes and characteristic features of my ground working implement will be in part obvious from the accompanying drawings and in part pointed out as the description of the invention progresses. In describing the invention in detail reference will be made to the accompanying drawings in which like reference characters designate corresponding parts throughout the several views and in which:

Figure 1 is a partial plan view of a ground working implement embodying my invention.

Figure 2 is a side elevation thereof showing the scraper bowl in carrying position.

Figure 3 is a sectional view on the line 3—3 of Figure 1 showing the scraper bowl in digging position.

Figure 4 is a similar sectional view showing it in dumping and spreading position.

Figure 5 is a sectional view on the line 5—5 of Figure 3 illustrating the rear wheel construction.

Figure 6 is an enlarged sectional view on the line 6—6 of Figure 5; and

Figure 7 is a sectional view on the line 7—7 of Figure 2 showing the front wheel construction.

On the accompanying drawings I have used the reference character 10 to indicate front wheels and 12 rear wheels of my ground working implement. Preferably the wheels 10 and 12 are provided with pneumatic tires and in number there are two of the front wheels and four of the rear ones.

A U-shaped frame 13 is provided having its cross member supported by the front wheels 10 in the following manner. An axle shaft 14 is provided on which the wheels 10 are journaled. The shaft 14 is secured as by welding to the web 15 of a channel shaped axle member, the front and rear flanges of which are indicated at 16 and 17. Transversely between the flanges 16 and 17 is a sleeve 18 pivoted on a pivot bolt 19. The sleeve 18 has extending upwardly therefrom a king pin 20. The king pin 20 is rotatable in a sleeve 21 welded to the U-shaped frame 13 and suitably braced by plates 22.

The ends of the flange 16 are bent forwardly as at 23 to provide perforated tongue pin ears. A tongue pin 24 is mounted therein and connected with the tongue pin is a tongue 25. The tongue is suitably braced by angularly extending bars 26 and has at its forward end a coupler 27 for connection with a tractor or the like.

The rear or terminal arms of the U-shaped frame 13 are pivoted at 28 to side plates 29 of a scraper bowl. Between the side plates 29, the scraper bowl is formed with a curved back and bottom wall indicated at 31. At the forward edge of the bottom wall a scraper blade 31ª is formed or may be a separate removable part if desired. The curvature of the wall 31 is on a radius from the axis of a push out blade shaft 32 which is supported by the side plates 29.

The side plates 29 are provided with rearward extensions 30. There are two of the extensions 30 and corresponding to them are other extensions 33 from the wall 31 of the scraper bowl. At each side of the ground working implement a rear axle 34 is provided for the extensions 30 and 33. The rear axle 34 has collars 35 fixed on its ends by set screws 36 and these collars are of the shape shown in cross section in Figure 6. They normally rest under moon shaped supports 37 welded to the extensions 30 and 33 as shown in Figures 5 and 6. Cap screws 38 extend into the ends of the rear axle 34 so that upon removal of the cap screws and elevation of the scraper bowl by a jack or the like, the rear wheels 12 can be rolled out of position and the wheels or tires repaired. This construction facilitates removal of the wheels and tires.

An apron 39 is provided for the front of the scraper bowl. It is supported by apron arms 40 which are pivoted at 41.

A rock shaft 42 is pivoted on the frame 13. It has an upstanding arm 43 and a pair of arms 44. The arms 44 are connected by links 45 to the scraper bowl.

A push out blade 46 is mounted on the shaft 32 and has an upstanding arm 47. The push out blade is normally biased to its inactive position of Figure 3 by springs 48 and 49.

I provide a pair of cable sets one of which includes a cable 49 and pulleys 50, 51, 52, 53 and 54. The pulley 50 is swivelly mounted on the post like element 21—22 at the front of the frame 13. The pulleys 51 and 53 are carried by the front of the frame while the pulleys 52 and 54 are carried by the arm 43. Finally the terminal end of the cable 49 is secured to the frame 13 as at 55.

The cable 49 when drawn forwardly by a winch or the like (not shown) on the tractor pulling the ground working implement will swing the arm 43 forwardly for raising the scraper bowl, for instance, from the position in Figure 3 to the positions of Figures 4 and 2.

The other cable set includes a cable 56 and pulleys 57, 58, 59, 60, 61, 62, 63, 64 and 65. The rear end of the cable 56 is anchored at 65a. The pulley 57 is swivelly mounted on the post like element 21—22. The pulley 58 is mounted on the front end of the frame 13. The pulley 59 is mounted on the arm 43 and the pulley 60 is mounted on the apron 39 which is suitably slotted as at 65b to accommodate the pulley 60. The pulleys 61, 63 and 65 are mounted on the arm 47 and the pulleys 62 and 64 are stationarily mounted on the back end of the scraper bowl.

The cable 56 when pulled upon by a winch (not shown) will first elevate the apron 39 from the position of Figure 2 to the position of Figure 3, the apron being in substantially its fully open position in Figure 3. Further retraction of the cable 56 will act upon the arm 47 to swing it towards the pulleys 62 and 64 thus swinging the push out blade from the position in Figure 3 to the position of Figure 4. This pushes the load out of the scraper bowl and cleans out the bowl at the same time. During this operation the bowl may be adjusted to any desired height as the implement is propelled along the ground for spreading the contents of the scraper bowl, for instance as shown by dotted lines at 66 in Figure 4.

While the scraper bowl is in the raised position of Figure 2, the apron is closed. If the cable 56 is now retained in fixed position with respect to the winch which is used for retracting it, when the cable 49 is let out as in Figure 3 to lower the scraper bowl to digging position the apron will automatically raise due to the construction and arrangement of the cable system and its pulleys, arms, etc. Since the pulley 59 moves away from the pulley 58 as the scraper bowl lowers from the position of Figure 2 to the position of Figure 3 this will effect a shortening of the portion of the cable 56 between the pulleys 59 and 61 thereby raising the pulley 60.

The push out blade 46 may be suitably reinforced by plates or flanges 67 formed of the same plates as provide the arm 47. The blade 32 may also be reinforced by plates 68 welded at laterally spaced points along the back of it and the bottom of the scraper bowl wall 31.

In accordance with the provisions of the patent statutes I have described the principle of operation of my invention together with an illustration thereof which I consider at present to represent the best embodiment of the invention. I desire it to be understood, however, that the structure disclosed is illustrative only and that the invention may be carried out by other means and that modifications can be made in the structure particularly by the use of mechanical equivalents falling within the scope of the appended claims.

I claim as my invention and desire to secure by Letters Patent of the United States:

1. In a ground working implement, a frame which is wheel supported at its front end, a wheeled scraper bowl pivoted to the rear end of said frame for lowering to digging position and raising to carrying and spreading positions, said scraper bowl having a back and a bottom formed on an arc of constant radius, said bottom terminating at its forward edge in a digging blade, an apron for the front of said scraper bowl, said apron being movable to closed and open positions relative to said scraper bowl, means for raising said apron including a pulley carried thereby, a swinging arm carried by said frame and operatively connected with said scraper bowl to lower it to digging position by swinging of said arm, a pulley carried by said arm, a cable from said frame, over said last pulley, under the pulley on said apron and to said bowl for effecting such raising of said apron, a push out blade pivoted on the center for said constant radius, means biasing said push out blade to remain in inactive position, said cable being operatively connected with said push out blade to move it to active position, said means biasing said push out blade to remain inactive effecting retention of the push out blade until said apron is fully raised and upon further operation of said cable thereafter, effecting movement of said push out blade to active position.

2. In a ground working implement, a wheel supported frame, a wheel supported scraper bowl pivotally connected to said frame for lowering to digging position, said scraper bowl having a curved back and bottom terminating at the forward edge of said bottom in a digging blade, a swingable push out blade cooperating with said curved back and bottom, an apron for the front of said scraper bowl, said apron being movable to closed and open positions relative to said scraper bowl and a single cable for raising said apron when said scraper bowl is lowered to digging position and thereafter moving said push out blade to active position, said apron having a pulley, said pushout blade having an arm, and said frame having front and rear pulleys ahead of said apron and back of said arm, said cable extending successively over said front pulley, said apron pulley and said rear pulley and operatively connected with said arm to effect such raising of said apron and moving of said pushout blade to active position as said cable is reeled in.

3. In a ground working implement, a scraper bowl having a curved back and bottom and a digging blade at the forward edge of said bottom, extensions rearwardly from said scraper bowl, rear wheels connected therewith, a frame pivoted to the sides of said bowl ahead of said rear wheels and extending forwardly therefrom to a position in front of the bowl, front wheels supporting the forward end of said frame, an apron movable to close and open the front of said scraper bowl, a push out blade pivoted in said scraper bowl at the center from which the back and bottom of the scraper bowl are curved, means for elevating said apron and moving said push out blade to active position, said means comprising a rock shaft on said frame, an arm extending upwardly therefrom, two sets of pulleys carried by said arm, a connection between said rock shaft and said scraper bowl for effecting raising and lowering of the bowl upon rocking of said rock shaft, two sets of pulleys carried by the front of said frame, a pulley on said apron, an arm extending upwardly from the push out blade axis, a pulley carried thereby, a pulley carried by the back of said scraper bowl and two cables, one passing over one of said sets of frame pulleys and one of said sets of first arm pulleys only for controlling the raising and lowering of said scraper bowl and the second cable extending over all of said pulleys except said sets of pulleys over which the first cable passes for controlling both said apron and said push out blade.

4. In a ground working implement, a scraper bowl, extensions rearwardly from said scraper bowl, rear wheels connected therewith, a frame pivoted to the sides of said bowl ahead of said rear wheels and extending forwardly therefrom to a position in front of the bowl, front wheels supporting the forward end of said frame, an apron movable to close and open the front of said scraper bowl, means for elevating said apron comprising a rock shaft on said frame, an arm extending upwardly therefrom, pulleys carried by said arm, a connection between said rock shaft and said scraper bowl for effecting raising and lowering of the bowl upon rocking of said rock shaft, pulleys carried by the front of said frame, a pulley carried by said apron and two cables over said frame pulleys and said arm pulleys, one cable for controlling the raising and lowering of said scraper bowl and the second cable extending around the pulley on said apron for controlling the movement thereof.

5. In a ground working implement, a scraper bowl having a digging blade, rear wheels for said bowl, a frame pivoted to the sides of said bowl and extending forwardly therefrom to a position in front of said scraper bowl, front wheels supporting the forward end of said frame, a push out blade pivoted in said scraper bowl, means for moving said push out blade to active position, said means comprising a rock shaft on said frame, an arm extending upwardly therefrom, two sets of pulleys carried by said arm, a connection between said rock shaft and said scraper bowl for effecting raising and lowering of the bowl upon rocking of said rock shaft, two sets of pulleys carried by the front of said frame, an arm extending upwardly from the push out blade axis, a pulley carried thereby, a pulley carried by the back of said scraper bowl and two cables, one passing over the one set of said frame pulleys and the one set of said first arm pulleys only for controlling the raising and lowering of said scraper bowl and the second cable extending over all of said other pulleys for controlling said push out blade.

6. In a ground working implement, a scraper bowl having a curved back and bottom and a digging blade at the forward edge of said bottom, rear wheels connected with said scraper bowl, a frame for said bowl, front wheels supporting the forward end of said frame, an apron movable to close and open the front of said scraper bowl, a push out blade pivoted in said scraper bowl at the center from which the back and bottom of the scraper bowl are curved, means for elevating said apron and moving said push out blade to active position, said means comprising a rock shaft on said frame, an arm extending upwardly therefrom, two sets of pulleys carried by said arm, a connection between said rock shaft and said scraper bowl for effecting raising and lowering of the bowl upon rocking of said rock shaft, two sets of pulleys carried by the front of said frame, an arm extending upwardly from the push out blade axis, a pulley carried thereby, a pulley carried by the back of said scraper bowl, a pulley carried by said apron and two cables, one passing over one of the sets of frame pulleys and one of the sets of first arm pulleys only for controlling the raising and lowering of said scraper bowl and the second cable extending over all of said other pulleys for controlling said apron and push out blade.

7. A ground working implement comprising a scraper bowl having a digging blade, wheels connected with said scraper bowl, a frame connected to the bowl and extending forwardly to a position in front thereof, wheels supporting the forward end of same frame, a push out blade pivoted in said scraper bowl, means for moving said push out blade to position for expelling the contents of the bowl, said means comprising a rock shaft on said frame, an arm extending upwardly therefrom, two sets of pulleys carried by said arm, a connection between said rock shaft and said scraper bowl for effecting raising and lowering of the bowl upon rocking of said rock shaft, two sets of pulleys carried by the front of said frame, an arm extending from said push out blade for actuating it, a pulley carried thereby, a pulley carried by the back of said scraper bowl, and two cables, one passing over one of said sets of frame pulleys and one of said sets of first arm pulleys for controlling the raising and lowering of the bowl, and the second cable extending over all of said pulleys except said sets of pulleys over which the first cable passes for controlling said push out blade.

8. In a ground working implement, a scraper bowl, a supporting frame for said bowl, said bowl being pivoted to said frame, an apron movable to close and open the front of said scraper bowl, means for elevating said apron comprising a rock shaft on said frame, an arm extending therefrom, pulleys carried by said arm, a connection between said rock shaft and said scraper bowl for effecting raising and lowering of the bowl upon rocking of said rock shaft, pulleys carried by the front of said frame, a pulley carried by said apron and two cables over said frame pulleys and said arm pulleys, one cable for controlling raising and lowering of said scraper bowl and the second cable extending around the pulley on said apron for controlling the movement thereof.

ALONZO CHLOE COX.